No. 653,687. Patented July 17, 1900.
W. MIDDLEDITCH.
PILL MAKING MACHINE.
(Application filed Apr. 21, 1899.)

(No Model.) 2 Sheets—Sheet 1.

WITNESSES
Chas. E. Wisner
John N. Goodrich

INVENTOR
Walter Middleditch
By Parker & Burton
Attorneys.

THE NORRIS PETERS CO., PHOTO-LITHO., WASHINGTON, D. C.

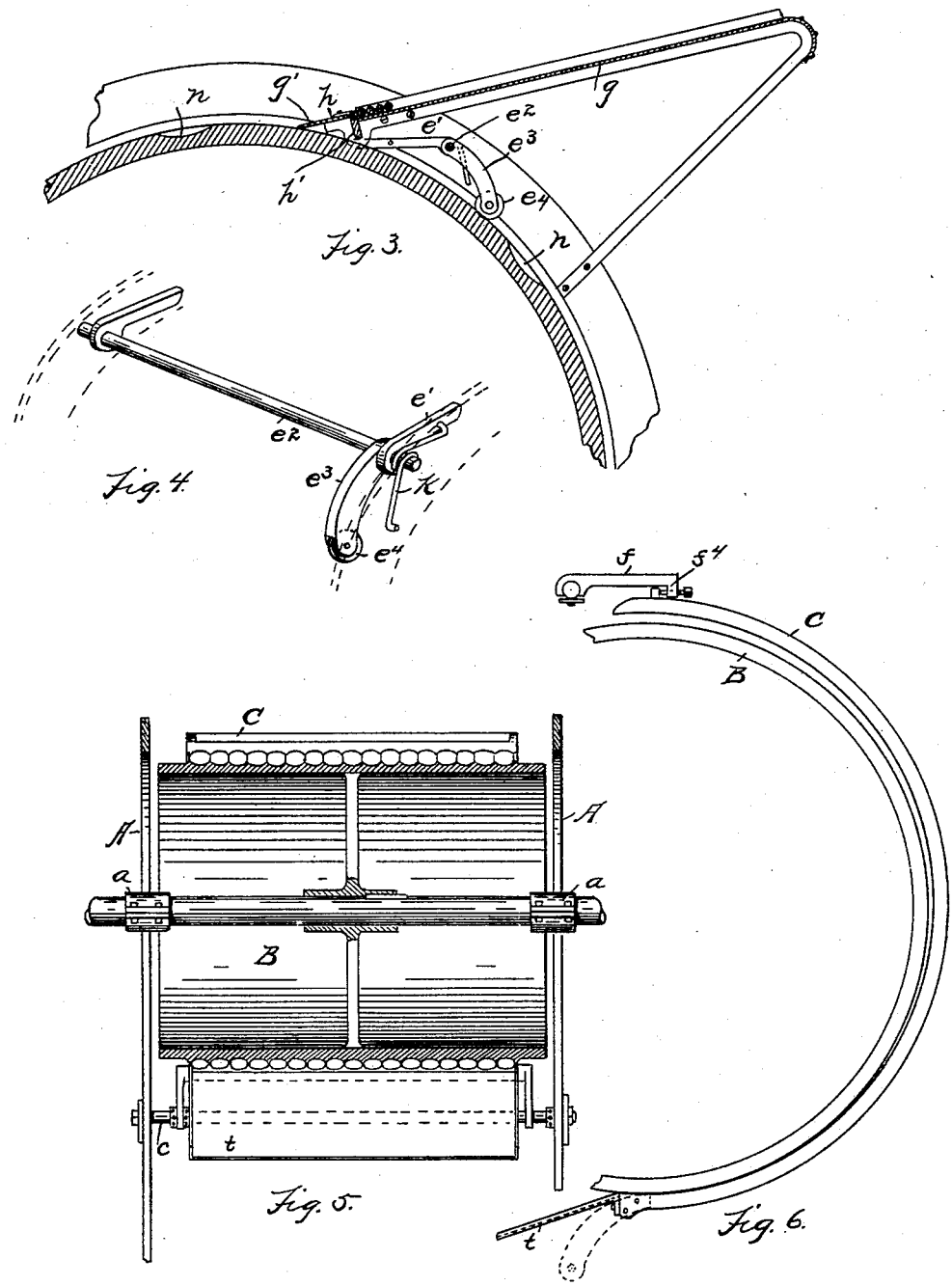

UNITED STATES PATENT OFFICE.

WALTER MIDDLEDITCH, OF DETROIT, MICHIGAN.

PILL-MAKING MACHINE.

SPECIFICATION forming part of Letters Patent No. 653,687, dated July 17, 1900.

Application filed April 21, 1899. Serial No. 713,937. (No model.)

*To all whom it may concern:*

Be it known that I, WALTER MIDDLEDITCH, a citizen of the United States, residing at Detroit, county of Wayne, State of Michigan, have invented a certain new and useful Improvement in Pill-Making Machines; and I declare the following to be a full, clear, and exact description of the invention, such as will enable others skilled in the art to which it pertains to make and use the same, reference being had to the accompanying drawings, which form a part of this specification.

This invention relates to pill-making machines, and has for its object an improved machine adapted to roll pills rapidly, of accurate size and of uniform consistency, thus insuring equality of weight and uniformity of size.

Figure 1:
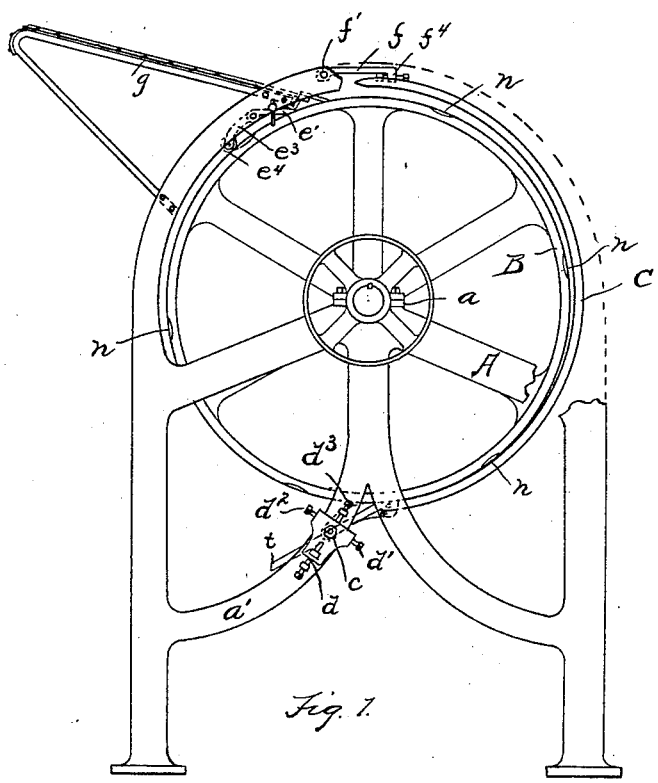
Figure 2:
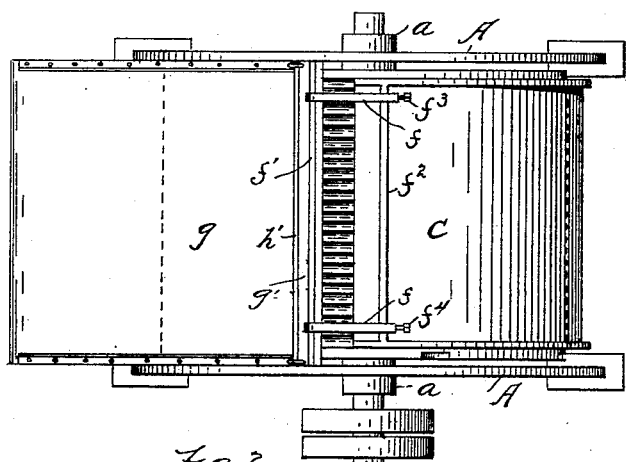

In the drawings, Figure 1 is a side elevation. Fig. 2 is a plan view. Fig. 3 is a detail showing the action of the automatic feed. Fig. 4 is a perspective of the feed-actuating lever of Fig. 3. Fig. 5 is a vertical longitudinal section of the machine. Fig. 6 is a diagram showing the adjustment of the concave to the cylinder.

A indicates a frame with journal-bearings $a$, in which are supported the journals of the cylinder B. The cylinder B is provided with a number of grooves that extend around it. The grooves may be semicircular in cross-section or semi-oval in cross-section, the semicircular groove being adapted to produce a round pill and the semi-oval to produce an ovate pill.

C indicates a grooved concave that extends about half-way around the cylinder B and is held adjustable with respect to the cylinder B at both ends. At its lower end it is generally held close to the cylinder B, and this lower end is carried on a journal $c$, which is in an adjustable bearing held by set-screws to a bar $a'$ of the frame. The set-screws or adjusting-screws $d$, $d'$, $d^2$, and $d^3$ allow the bottom or tail end of the grooved concave C to be adjusted with reference to the cylinder B, and the adjustment at this end of the concave is used in conjunction with the adjustment at the upper end of the concave to change the relative position of said upper end and the feeding mechanism if that adjustment be desired. The upper end of the concave is held to the frame A by hinged arms $f$, one end of each of which engages with a hook connection to the bar $f'$ and the other of which engages with a rib $f^2$ on the concave. The arms $f'$ are held to the rib on the concave by set-screws $f^3$ and $f^4$. The concave is grooved on its inner surface with grooves of the same character as those which are around the roller, and the grooves of the one part are made to register with the grooves of the other part. The shaft $c$ has an end adjustment, so that this register of grooves may be readily brought about.

The feeding mechanism consists of a table $g$, supported on brackets above the main part of the frame A. The table $g$ slants downward enough so that pipes of pill mass laid upon it will readily roll down the upper face of it. At the lower end is a stop $h$, and just in front of the stop and at the bottom of the table $g$ is a vertically-sliding plate $h'$. The sliding plate is actuated by a lever $e'$, held to a pin $e^2$, and the free end of the lever has hinged to it a link $e^3$, provided at its free end with a friction-wheel $e^4$. Each end of the cylinder B is provided around its periphery with a number of notches $n$, into which the friction-wheel $e^4$ drops as the cylinder revolves. Between the stop $h$ and the cylinder the table $g$ is continued for a short distance and on a higher plane by a short table $g'$.

The wheel $e^4$ and the arm $e^3$ are pressed downward against the periphery of the cylinder B by a spring $k$, and whenever the friction-wheel $e^4$ drops into the notch $n$ the plate $h'$ is lifted and the lowermost of the pipes of pill mass on the table $g$ is lifted to the upper surface of the table $g'$ and immediately rolls forward and is dropped on the cylinder B and carried forward by said cylinder B under the concave, is cut into pieces by the ribs between the grooves, and the pieces are rolled into pills and delivered over the tailboard $t$ into any suitable receptacle.

What I claim is—

1. In a pill-making machine, in combination with a grooved cylinder and a grooved concave, means for adjusting the delivery of the concave with respect to the cylinder, means for adjusting the receiving end of the concave with respect to the cylinder, a feed-table provided with a stop, a lifting-lever arranged to lift a roll of pill mass over the stop, substantially as described.

2. In a pill-making machine, in combination with a grooved cylinder provided with notches n, in its periphery, and a grooved concave, a feed-table provided with a stop, a lifting-lever provided with a wheel adapted to enter said notches and thereby to lift a roll of pill mass over the stop, substantially as described.

In testimony whereof I sign this specification in the presence of two witnesses.

WALTER MIDDLEDITCH.

Witnesses:
CHARLES F. BURTON,
MARION A. REEVE.